May 4, 1926.

W. D. FREDERICK 1,583,451

GANG FRAME FOR AGRICULTURAL IMPLEMENTS

Filed Nov. 28, 1923    2 Sheets-Sheet 1

INVENTOR
William D. Frederick
BY
William A. Smith, Jr.
ATTORNEY

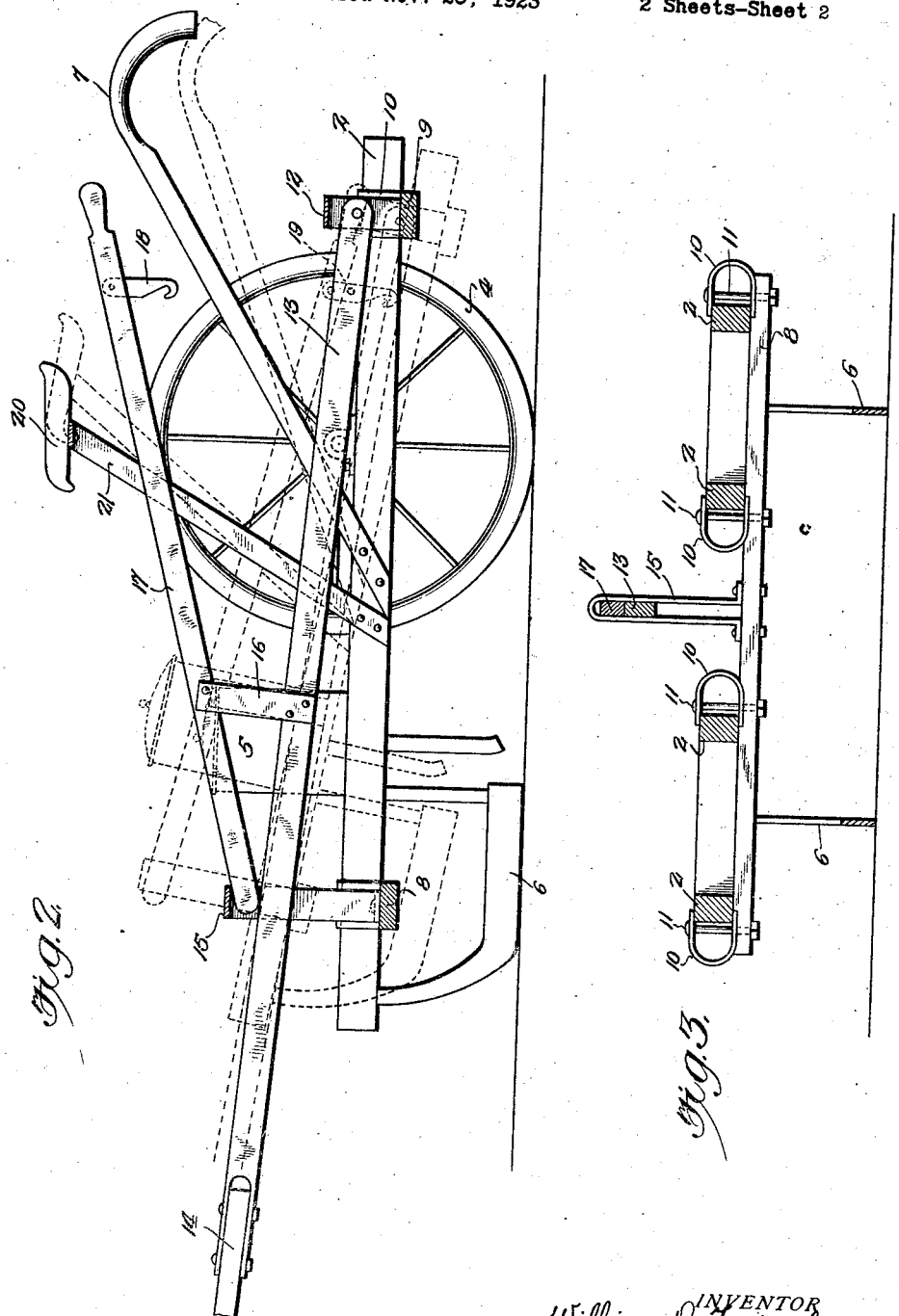

Patented May 4, 1926.

1,583,451

UNITED STATES PATENT OFFICE.

WILLIAM D. FREDERICK, OF FARMINGTON, MAINE.

GANG FRAME FOR AGRICULTURAL IMPLEMENTS.

Application filed November 28, 1923. Serial No. 677,449.

*To all whom it may concern:*

Be it known that I, WILLIAM D. FREDERICK, a citizen of the United States, residing at Farmington, in the county of Franklin and State of Maine, have invented certain new and useful Improvements in Gang Frames for Agricultural Implements, of which the following is a specification.

This invention relates to gang frames for agricultural implements, and has particular reference to an improved frame upon which may be mounted, two or more plows, planters cultivators or the like, in order to combine such implements into a single machine.

The object of this invention is to provide a frame for detachably connecting two or more standard agricultural implements, usually operated singly, in such a manner that the implements may be combined to function as a single machine, thus greatly increasing the amount of work performed by such implements, and reducing the number of operators required to control the implements to the minimum.

A further object of the invention is to provide a gang frame for combining or connecting two or more standard agricultural implements, in which the entire frame is supported on the wheels of such implements, and in which the forward end of the frame is vertically adjustable to enable the foward ends of the several implements carried by the frame to be raised and maintained out of contact with the ground, as when turning at the ends of rows or while traveling from field to field.

A further object of the invention is to provide means whereby the forward end of the frame and the forward ends of the several implements carried thereby may be readily raised and maintained out of contact with the ground, and in which the forward ends of the implements and forward end of the frame are vertically movable to enable the implements to accommodate themselves to obstructions or irregularities in the surface being worked.

A still further object of the invention is to provide a device of the above mentioned character which is simple in construction, inexpensive to manufacture, strong and durable and highly efficient in the purposes for which designed.

Referring to the accompanying drawings, forming a part of the specification and in which like numerals are employed to designate like parts throughout the several views;

Fig. 2 is a sectional view on the line 2—2 of Fig. 1, showing the frame and planters in the raised and lowered positions, and Fig. 3 is a sectional view on the line 3—3 of Fig. 1, disclosing certain details of construction.

Figure 1:
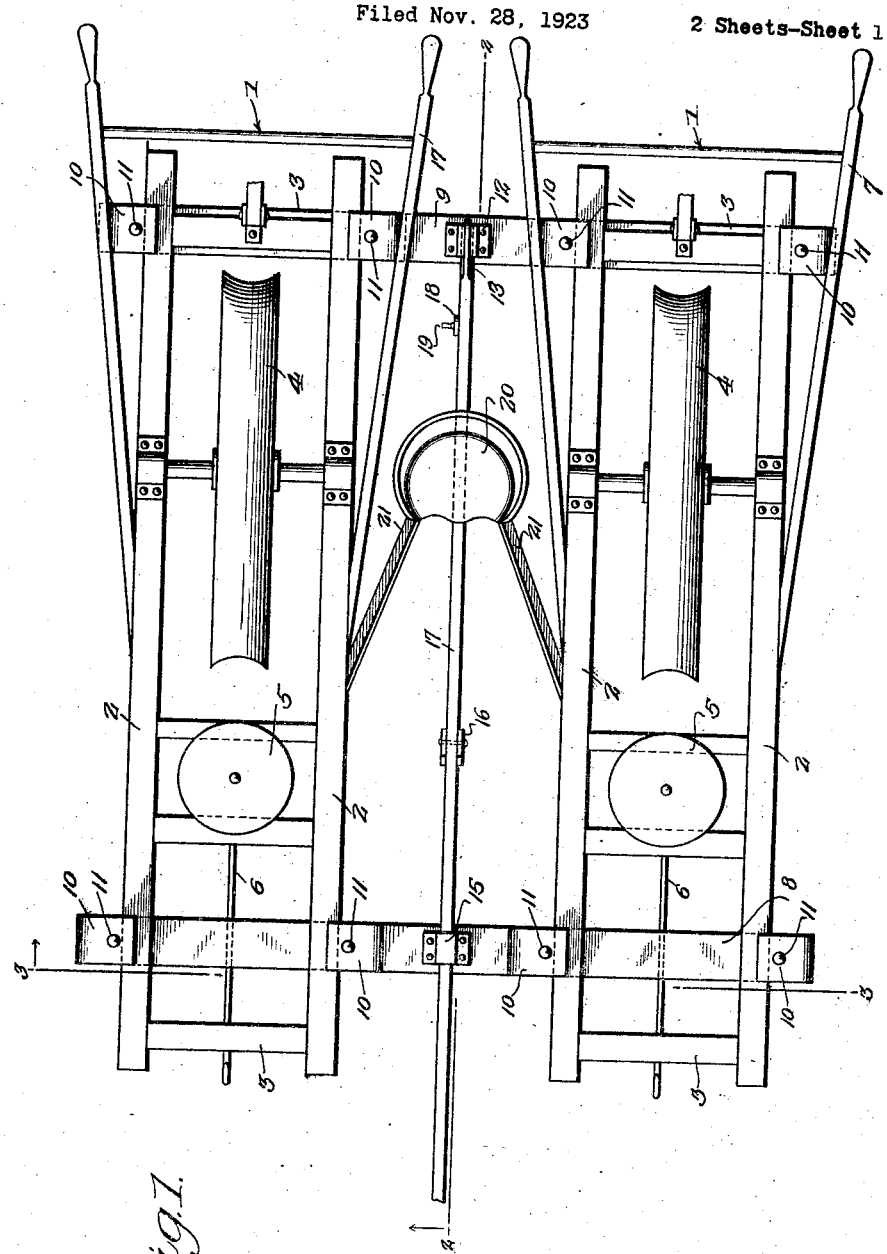
Fig. 1 is a plan view of a frame constructed in accordance with my invention, showing two planters of standard construction combined to produce a single machine.

Referring to the drawings, wherein for the purpose of illustration is shown a preferred embodiment of my invention, the numeral 1 designates broadly a standard type of single-row corn planter comprising longitudinally extending side beams, 2, connected at opposite ends by transverse beams 3 and constituting the frame of the planter. This planter frame is supported by the ground engaging wheel 4, and carries near its forward end the usual seed hopper 5 and the furrow-opener or ground-engaging runner 6. Mounted on the side beams 2 and extending rearwardly are the implement handles 7, by means of which the planter is moved and guided over the ground. All of the above construction is old and well known in the art and forms no part of the present invention.

My improved means for detachably connecting or combining two or more standard agricultural implements, for example, two or more planters of the type specified above, comprise a forward beam 8 and a rear beam 9. Each of these beams 8 and 9 are provided with pairs of spaced clamping or fastening means, which may comprise the U-shaped strips 10 adapted to engage the beams 2 of the seed-planters 1 and to be rigidly secured thereto by means of the clamping bolts 11. Intermediate the ends of the rear beam 9, preferably about midway thereof, is mounted a bracket 12, to which is pivotally connected a longitudinally extending bar or lever 13, to the forward end of which is attached a tongue or other draft applying device 14 for attaching a team of horses or a tractor. The forward beam 8 has attached thereto at a point about midway its length, an inverted U-shaped guide bracket 15, adapted to straddle the bar or lever 13. At a point between the two beams 8 and 9, the bar or lever 13 is provided with an upwardly extending bracket 16, at the upper end of which is pivotally mounted an operating lever 17, the forward end of which extends under the inverted U-shaped bracket 15. The rear end of the operating lever 17 is provided with a suitable catch 18 adapted to engage a laterally extending pin 19 carried by the bar or lever 13. A driver's or operator's seat 20 is arranged on the machine above the operating lever 17, and is supported by the seat-supporting members 21, attached to the side beams 2 of adjacent planters.

In operation when it is desired to combine two or more standard seed-planters, cultivators or other agricultural implements into a single machine, the rear beam 9 is placed near the rear ends of the selected implements and the clamps 10 secured thereto by means of the clamping bolts 11. The forward ends of the selected implements are likewise clamped or secured to the forward bar 8, thus providing a series or battery of implements, all maintained in aligned, parallel, spaced relation. The bar 13 is then attached to a tongue or other draft applying device and the combined implements are ready for use as a single machine.

When performing the planting operation, the various parts of the seed-planters 1 and of the gang frame, are in the position shown in full lines in Fig. 2, with the furrow-opener or ground-engaging runner 6 in contact with the ground and the operating lever 17 in the unlatched or raised position. Due to the elongated, inverted U-shaped bracket 15 which straddles the bar 13, the forward beam 8 and the forward ends of the several implements carried on the beam, are free to move vertically in order to accommodate themselves to irregularities in the surface being worked.

When it is desired to raise the ground-engaging runners 6 out of contact with the ground, as when turning at the ends of rows, or while traveling from field to field, the rear end of the operating lever 17 is forced downwardly. This downward movement of the rear end of lever 17, which is pivotally mounted on the bracket 16, causes the forward end of this lever, which is beneath the inverted U-shaped bracket, to raise, thus lifting the forward beam 8 and the forward ends of the several implements carried by the beam. The latch 18 is then engaged with the laterally extending pin 19 and the forward ends of the several implements are thus maintained in raised position out of contact with the ground, as shown in dotted lines in Fig. 2.

While I have elected to describe and illustrate my improved frame as used in connection with two single row seed-planters, it should be understood that the seed-planters are shown and described merely to explain and teach the construction and operation of my improvement. Instead of using the particular type of planter shown, various other types may be employed, or any of the standard plows, cultivators or other agricultural implements may be combined to produce a single machine. It is to be further understood that while I have shown only two single-row seed-planters combined to produce a two-row seed-planter, I do not limit the use of the invention to two implements only. By extending the length of the forward beam 8 and the rear beam 9 of the frame, and increasing the number of clamps or fastening means 10, any number of machines may be associated. It is also to be understood that the form of my invention shown and described is to be taken as a preferred embodiment of the same and that various changes in the shape, size, and arrangement of parts may be resorted to without departing from the spirit of the invention or the scope of the subjoined claims.

Having thus described my invention, what I claim as new and desire to secure by Letters Patent is:

1. A gang frame for agricultural implements, comprising a rear beam and a front beam, means for detachably connecting a series of independent implements to said beams, a forwardly extending draft bar pivotally mounted on the rear beam, a bracket mounted on the front beam, and an operating lever freely engaging said bracket for raising and lowering the front beam and the front ends of the several implements carried thereby, the connection between the bracket and operating lever permitting the front beam to raise independently of the position of the operating lever.

2. A gang frame for agricultural implements, comprising a rear beam and a front beam, means for detachably connecting a series of independent implements to said beams, a forwardly extending draft bar pivotally mounted on said rear beam, an inverted U-shaped bracket secured to the front beam and straddling the draft bar, and an operating lever engaging beneath the closed end of said bracket for raising and lowering the front beam and the front ends of the several implements carried thereby, the connection between the bracket and operating lever permitting the front beam to raise independently of the position of the operating lever.

In testimony whereof I hereunto affix my signature.

WILLIAM D. FREDERICK.